UNITED STATES PATENT OFFICE.

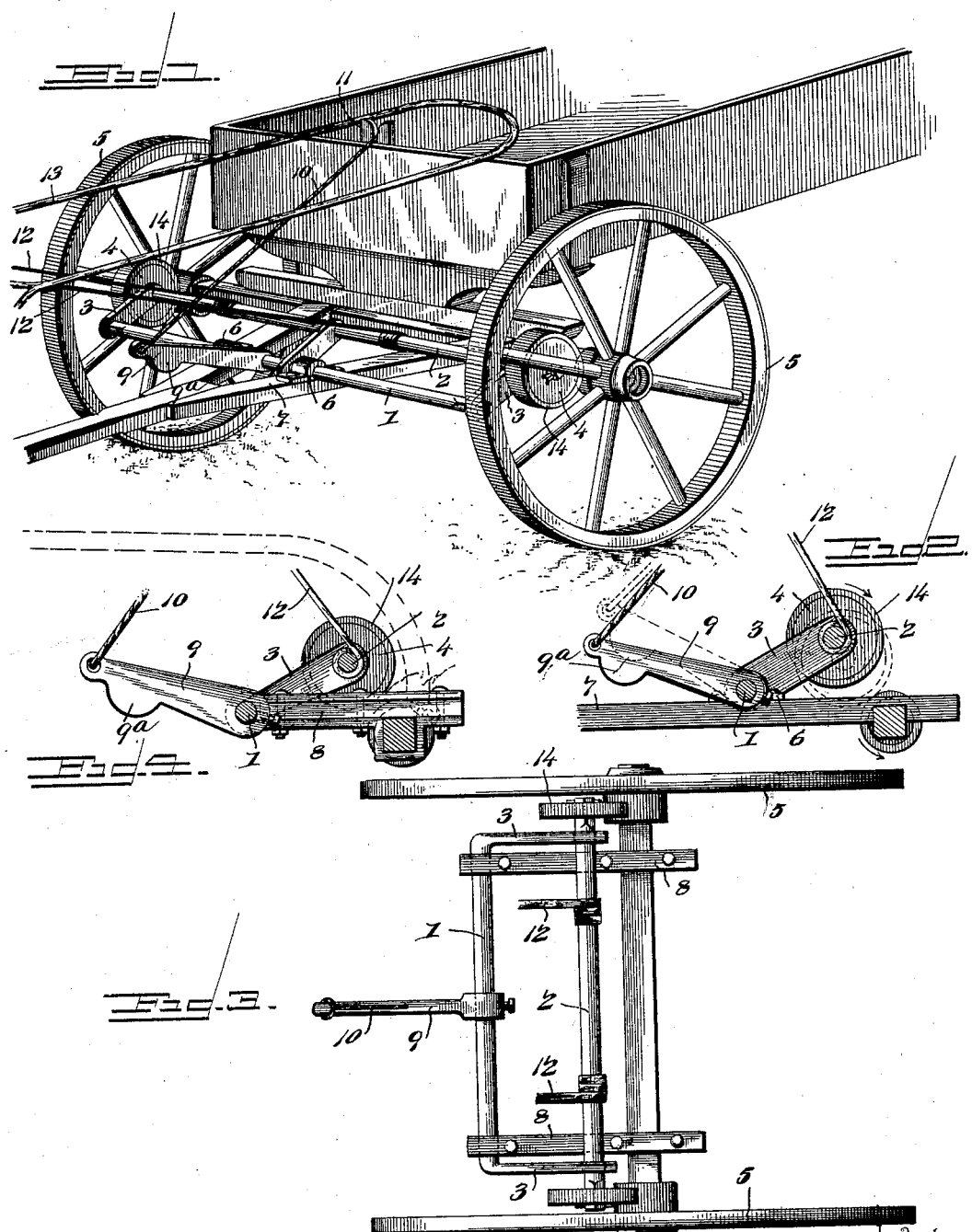

JAMES M. SINGLETON, OF LUFKIN, TEXAS.

APPARATUS FOR CHECKING RUNAWAY HORSES.

SPECIFICATION forming part of Letters Patent No. 609,841, dated August 30, 1898.

Application filed February 7, 1898. Serial No. 669,404. (No model.)

*To all whom it may concern:*

Be it known that I, JAMES M. SINGLETON, a citizen of the United States, residing at Lufkin, in the county of Angelina and State of Texas, have invented a new and useful Apparatus for Checking Runaway Horses, of which the following is a specification.

This invention has relation to that class of apparatus applied to a wagon or like vehicle and operating, in conjunction with the wheels thereof, for curbing and bringing into subjection a runaway animal or team hitched to the wagon for drawing it.

The invention is designed, primarily, to provide means which can be instantly thrown into operation by the driver to effect a pulling upon the lines, so as to curb the animal or team, and which can be instantly thrown out of action to release the reins after the team has been brought under control, thereby obviating injury to the animal, which would be likely to follow if no provision were made for the quick release of the lines after the team had been brought into subjection.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a perspective view showing the application of the invention. Fig. 2 is a longitudinal section showing the operation by dotted lines. Fig. 3 is a top plan view showing different means for adapting the invention for a buggy or other light vehicle to be drawn by a single animal. Fig. 4 is a longitudinal section.

Corresponding and like parts are referred to in the following description and indicated in all the views of the drawings by the same reference characters.

The invention is applied to the forward portion of the running-gear, and the manner of mounting it will depend upon the character and class of vehicle to which the device is applied. It is to be understood in this connection that while it is preferred to locate the device upon the forward portion of the running-gear it may be placed in any convenient position, so as to operate in conjunction with either the front or the rear wheels. It is more convenient and advantageous to apply the apparatus to the forward portion of the running-gear, and for this reason it is so illustrated in the drawings.

The device comprises parallel shafts 1 and 2, end connecting-pieces 3, and wheels or pulleys 4, secured to the end portions of the shaft 2, so as to rotate therewith. The shaft 1 is mounted in bearings so disposed as to admit of the wheels or pulleys 4 being brought into engagement with the hub of the vehicle-wheel 5 when the device is thrown into operative position for effecting a pull upon the reins or lines.

When the device is applied to a vehicle having a pole or tongue, the shaft 1 is mounted in bearings 6, applied to the hounds 7 of the running-gear, and when applied to a vehicle having shafts or thills and designed to be drawn by a single animal the shaft 1 obtains bearings in the coupling-bars 8, applied to the end portions of the front axle. In either case the parts are disposed so that when the shaft 2 is thrown downward and rearward the wheels or pulleys 4 will come into contact with the hubs of the vehicle-wheels and be rotated thereby, so as to wind up the lines upon the shaft 2. The coupling-bars 8 are clipped at their rear ends to the front axle in such a manner as to make a rigid and firm connection therewith, and the shaft 1 is mounted in the front ends of the coupling-bars, so as to turn therein.

An arm 9 projects from the shaft 1, and an operating cord or strap 10 makes connection with the outer end thereof and extends within convenient reach of the driver, so as to be pulled upon when required to turn the shaft 1 in its bearings and bring the wheels or pulleys 4 into engagement with the hubs of the vehicle-wheels. The upper end of the operating cord or strap 10 is secured by a holder 11, applied to a convenient portion of the vehicle-body, and by this means the device is held normally out of action. The holder 11 may be secured to the dash of a buggy or to the bottom of the body or in any place found most convenient and which will admit of the upper end of the cord or strap 10 being readily accessible to be instantly grasped when it is required to bring the device into active operation.

Short lines 12 are connected at their front ends to the reins 13, preferably at the fork thereof, and their rear ends are secured to the shaft 2 in such a manner as to wind thereon when the shaft 2 is rotated by means of the vehicle-wheel in the manner set forth. This construction admits of the driver having control of the reins at all times, whether the device for mechanically controlling the team is in or out of action.

When the device is properly applied, it is held out of action by the cord or strap 10 in the manner set forth, and when the animal becomes fractious and tends to run away the cord or strap 10 is pulled upon, thereby bringing the device into action, so as to control the team by the mechanical appliances. When the wheels or pulleys 4 are brought into contact with the hubs of the vehicle-wheels, the shaft 2 is rotated and winds up the short lines 12 and pulls upon the reins and brings the animal or team under control. During the operation of the device the driver can direct the animal or team by means of the reins, and after proper control has been effected the device is thrown out of action and the reins instantly released by again operating the cord or strap 10, as will be readily understood.

The arm 9 extends forwardly and in an opposite direction to the end bars 3 and is weighted and serves to counterbalance the shaft 2, connecting-bars 3, and pulleys 4, so as to normally hold the said pulleys out of engagement with the hubs of the vehicle-wheels, as clearly indicated in Figs. 2 and 4. The front portion of the arm 9 is provided at its lower edge with an enlargement 9ᵃ to form the weight, and this projection or enlargement is adapted to rest upon and have its downward movement limited by the tongue or pole, as the mechanism is located above the hounds. The arm 9 is limited in its downward movement at its outer end by means of the cord or strap 10, which is engaged with the holder 11. When it is required to throw the mechanism into action, the cord or strap 10 is drawn upon, thereby lifting the outer end of the arm 9 and causing a corresponding lowering of the shaft 2, which brings the pulleys 4 into positive engagement with the hubs of the vehicle-wheels. The frictional engagement between the pulleys 4 and hubs of the vehicle-wheels will depend upon the amount of force exerted upon the cord or strap 10, and by engaging the latter with the holder 11 the said pulleys 4 may be held in contact with the hubs for any length of time. Upon releasing the cord or strap 10 the arm 9, by its superior weight, falling, will elevate the shaft 2 and move the pulleys 4 out of engagement with the hubs, thereby permitting the lines 12 to unwind from the shaft. The outer edges of the pulleys 4 are covered by rubber bands, leather, or like material 14, so as to prevent slipping when said pulleys are brought forcibly into engagement with the hubs.

Having thus described the invention, what is claimed, and desired to be secured by Letters Patent, is—

1. In a device of the class described, the combination with a running-gear, of a shaft 1 journaled directly upon the running-gear, supported by the same and provided with angularly-disposed pieces 3, having bearings at their outer ends, the shaft 2 journaled in the bearings of the pieces 3 and extended beyond the same, wheels mounted on the shaft 2 and arranged to engage the hubs of the adjacent vehicle-wheels, the lines connected with the shaft 2 and arranged to be wound thereon, and the weighted arm 9 secured to and extending from the shaft 1 and holding the wheels of the shaft 2 normally out of engagement with the vehicle-wheels, substantially as described.

2. In a device of the class described, the combination with a running-gear provided at the upper face of its front hounds with bearings, the shaft 1 journaled in the bearings and located above the said hounds and provided with rearwardly-extending pieces 3, the shaft 2 journaled on the pieces 3 at the outer terminals thereof and extended beyond the same, wheels mounted on the shaft 2 and arranged to engage the adjacent vehicle-wheels, the lines 12 connected with the shaft 2 and arranged to be wound thereon, and the arm 9 extending forward from the shaft 1 and rigidly connected with the same, said arm 9 being located above and adapted to have its downward movement limited by the tongue or pole, and provided near its outer end with a projection or enlargement forming a weight adapted to counterbalance the wheels of the shaft 2 and hold the same normally out of engagement with the vehicle-wheels, substantially as described.

In testimony that I claim the foregoing as my own I have hereto affixed my signature in the presence of two witnesses.

JAMES M. SINGLETON.

Witnesses:
J. H. GIBSON,
R. L. RUSSELL.